E. C. McCARTEY.
PNEUMATIC WHEEL.
APPLICATION FILED FEB. 12, 1916.
1,203,024.
Patented Oct. 31, 1916.
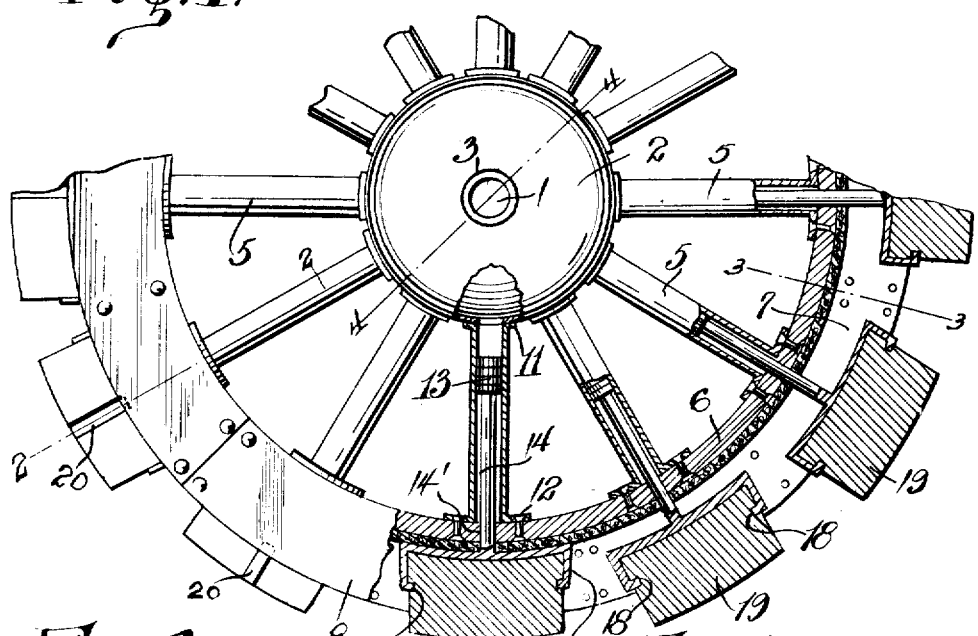
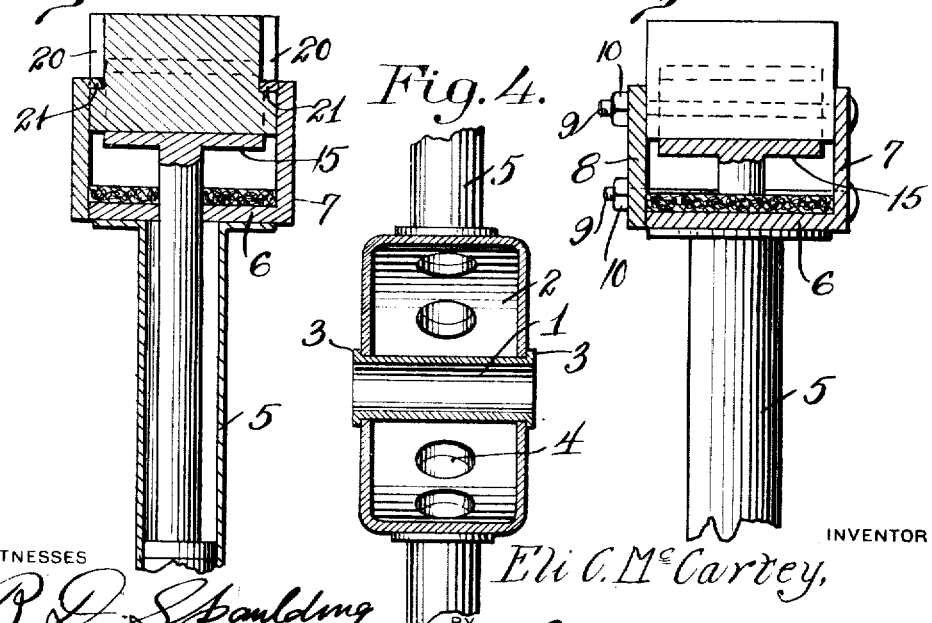
WITNESSES
INVENTOR
Eli C. McCartey,
ATTORNEY

UNITED STATES PATENT OFFICE.

ELI C. McCARTEY, OF LITTLETON, ILLINOIS.

PNEUMATIC WHEEL.

1,203,024.  Specification of Letters Patent.  Patented Oct. 31, 1916.

Application filed February 12, 1916.  Serial No. 77,984.

*To all whom it may concern:*

Be it known that I, ELI C. McCARTEY, a citizen of the United States, residing at Littleton, in the county of Schuyler and State of Illinois, have invented certain new and useful Improvements in Pneumatic Wheels, of which the following is a specification.

This invention relates to pneumatic wheels for vehicles and the primary object is to provide a wheel that will have all the resilient qualities of a wheel with a pneumatic tire.

A further object of the invention is the provision of a pneumatic wheel that will be provided with cushioning means at the hub thereof and a rim composed of ground engaging tread blocks which automatically move into and out of the cylinders which constitute part of the cushioning means.

The invention further aims to provide a pneumatic wheel which will have the outward appearance of the ordinary wheel and be of substantially the same general shape and construction of the ordinary wheels which are employed on motor trucks and heavy motor vehicles.

A further object of this invention is the provision of a pneumatic wheel which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a fragmentary elevation of my invention, parts being broken away. Fig. 2 is a section on the line 2—2 of Fig. 1. Fig. 3 is a section on the line 3—3 of Fig. 1. Fig. 4 is a section on the line 4—4 of Fig. 1.

The wheel is adapted to be mounted upon the ordinary spindle with which vehicle axles are provided. A hollow cylindrical sleeve 1 has its inner diameter of a size sufficient to adapt itself to the particular spindle upon which the wheel will be mounted. Mounted upon the sleeve 1 is an air-chamber 2 which has its side wall engaging with the flanges 3 which are formed upon the end of the sleeve 1. The manner of securing the flanges to the air-chamber 2 may be of any construction that will render the air-chamber air-tight. The outer periphery of the air-chamber 2 is provided with a series of radially arranged openings 4 and mounted upon the periphery of the chamber 2 are a series of cylinders 5 which have their inner bores communicating with the inside of the air-chamber 2 through the medium of the openings 4.

The felly of the wheel is constructed in the form of a channel which consists of the circular band or rim 6 having the flange 7 disposed at a right angle thereto which extends completely around the wheel. The opposite side of the wheel is provided with a series of sectional flanges 8 which are secured to the flange 7 by bolts 9 which extend across the channel and are provided with nuts 10 by which the sections 8 and the flange 7 may be secured together to complete the channel, which composes the felly of the wheel.

Each of the cylinders 5 is provided at its ends with flanges 11 and 12, the flanges 11 being secured to the periphery of the air-chamber and the flanges 12 secured to the band 6 on the inner periphery thereof. Each of the cylinders 5 has slidably mounted therein a piston 13 which is secured to a piston rod 14, one end of which is provided with a plate 15. Apertures 14' are provided in the plate 6 through which the piston rods 14 are adapted to extend. The plates 15 are provided with flanges 16 which have their ends bent inwardly to provide tongues 17 which extend into grooves 18 formed on each end of the tread blocks 19. The plates 15 are slightly curved to conform to the curve of the periphery of the wheel and a layer of felt or other resilient material is mounted upon the outer face of the band 6 and against which the plates 15 will strike when the tread blocks 19 engage the ground when the wheel is revolving. In order that the outward movement of the tread blocks 19 may be limited the tread blocks are provided with a groove 20 on each of their sides into which a lug 21, which is formed integrally with the flanges 7 and 8 at the edges thereof and which will engage the end of the grooves 20 and prevent the blocks 19 from being moved too far outwardly in the channel.

In the use of the wheel it is necessary to first fill the air-chamber 2 with compressed air which will cause the pistons to move outwardly to their limited extent, whereby the wheel may be mounted upon the axle of the vehicle and the weight of the vehicle will cause the tread block which engages the ground to thrust the piston into the cylindrical spoke, and by virtue of the compressed air therein contained, give a resiliency to the wheel as each successive block is moved into engagement with the ground by the revolving motion of the wheel. By reason of the tread blocks 19 and the fact that they may be removed when worn and new ones substituted, the device possesses many advantages which are not contained in the ordinary rubber tire.

From the foregoing it will be observed that a very simple and durable pneumatic wheel has been provided, the details of which embody the preferred form. I desire it to be understood, however, that slight changes or modifications in the minor details of construction may be made without departing from the spirit of the invention or the scope of the claim hereunto appended.

I claim:

A pneumatic vehicle wheel including an axle sleeve of hollow cylindrical formation, a cylindrical air-chamber mounted upon the sleeve, the periphery of said chamber being provided with a plurality of circumferentially spaced openings, a felly comprising an annular rim having a right angularly disposed flange at one edge, the opposite side of the felly provided with a plurality of flange sections, bolts extended across the annular rim and connecting the flange with said sectional flanges whereby a substantially channel-shaped felly is provided, a plurality of cylindrical spokes having flanges at each end secured to said annular rim and to said air-chamber, the interior of each of said spokes being in registration with the apertures in said air-chamber, a piston and piston rod arranged in each of said cylindrical spokes, said annular rim provided with apertures through which each of said piston rods are extended, plates carried by the outer ends of the piston rods and adapted to move with the piston rods, each of said plates being bent outwardly to provide flanges, tread blocks mounted upon said plates and provided with depressions at each of their ends, the said flanges on the plates being bent inwardly to provide tongues received in the said recesses whereby the displacement of said blocks from the plates will be prevented, the sides of each of said blocks having radially arranged grooves, the said sectional flanges and the said annular flange being provided with lugs at regularly spaced intervals extending into said grooves for limiting the outward movement of said tread blocks, and an annular layer of felt interposed between the said annular rim and the said plates.

In testimony whereof I affix my signature in presence of two witnesses.

ELI C. McCARTEY.

Witnesses:
KATY SULLIVAN,
D. D. BRUNER.